United States Patent
Hwang (10) Patent No.: US 12,534,132 B2
(45) Date of Patent: Jan. 27, 2026

(54) SYSTEM AND METHOD FOR PROVIDING A VISUAL AID FOR STEERING ANGLE OFFSET IN A STEER-BY-WIRE SYSTEM

(71) Applicant: FORD GLOBAL TECHNOLOGIES, LLC, Dearborn, MI (US)

(72) Inventor: Steve Hwang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 18/231,494

(22) Filed: Aug. 8, 2023

(65) Prior Publication Data

US 2025/0050947 A1 Feb. 13, 2025

(51) Int. Cl.
*B62D 15/02* (2006.01)
*B60K 35/23* (2024.01)
(Continued)

(52) U.S. Cl.
CPC ..... *B62D 15/0295* (2013.01); *B60W 60/0055* (2020.02); *B62D 5/006* (2013.01); *G06T 11/00* (2013.01); *G09G 3/001* (2013.01); *B60K 35/23* (2024.01); *B60K 35/28* (2024.01); *B60K 2360/175* (2024.01); *B60K 2360/178* (2024.01); *B60W 50/14* (2013.01); *B60W 2050/146* (2013.01); *G09G 2380/10* (2013.01)

(58) Field of Classification Search
CPC .. B62D 15/0295; B62D 5/006; B62D 15/025; B62D 15/029; B60W 60/0055; B60W 50/14; B60W 2050/146; G06T 11/00; G09G 3/001; G09G 2380/10; B60K 35/00; B60K 35/23; B60K 35/28; B60K 2360/175; B60K 2360/178; B60K 35/21; B60K 35/81; B60K 2360/167
See application file for complete search history.

(56) References Cited

U.S. PATENT DOCUMENTS 5,414,439 A 5/1995 Groves et al.
9,031,745 B2 5/2015 Bahena et al.
(Continued)

FOREIGN PATENT DOCUMENTS

CN 111055912 A 4/2020
CN 107600168 B 6/2020
(Continued)

*Primary Examiner* — James J Lee
*Assistant Examiner* — Alexander George Matta
(74) *Attorney, Agent, or Firm* — Burr & Forman; Lorne Forsythe (57) ABSTRACT

A vehicle control system for a vehicle with steer-by-wire steering may include a road wheel actuator operably coupled to a road wheel of the vehicle to position the road wheel based to a road wheel angle based on a target angle, a feedback actuator operably coupled to a steering wheel of the vehicle to generate the target angle based on a steering wheel angle and to generate feedback to an operator of the vehicle, a sensor network comprising sensors to detect the steering wheel angle and the road wheel angle, a display disposed in the vehicle to be visible to the operator of the vehicle during vehicle operation, and a controller for determining when a misalignment exists between the road wheel angle and the steering wheel angle and providing a visual indication of the misalignment on the display.

19 Claims, 6 Drawing Sheets

(51) Int. Cl.
  *B60K 35/28*   (2024.01)
  *B60W 50/14*   (2020.01)
  *B60W 60/00*   (2020.01)
  *B62D 5/00*    (2006.01)
  *G06T 11/00*   (2006.01)
  *G09G 3/00*    (2006.01)

(56) References Cited

U.S. PATENT DOCUMENTS

| | | | |
|---|---|---|---|
| 9,415,803 | B2 | 8/2016 | Takeda |
| 9,561,822 | B2 | 2/2017 | Taniguchi |
| 10,065,639 | B2 | 9/2018 | Taniguchi |
| 10,754,029 | B2 | 8/2020 | Talamonti et al. |
| 10,814,907 | B2 | 10/2020 | Naik et al. |
| 11,603,132 | B2 | 3/2023 | Suzuki |
| 2018/0229767 | A1* | 8/2018 | James .................. B62D 5/006 |
| 2022/0144086 | A1* | 5/2022 | Sakurai .................. B60K 35/10 |
| 2022/0242238 | A1* | 8/2022 | Choi ..................... G06T 11/203 |
| 2022/0410968 | A1 | 12/2022 | Akatsuka et al. |
| 2022/0410971 | A1 | 12/2022 | Yasuda et al. |
| 2023/0227097 | A1* | 7/2023 | Ojima .................. B62D 5/0484 |
| | | | 701/43 |
| 2023/0347884 | A1* | 11/2023 | Kim ................ B60W 30/18145 |
| 2024/0391527 | A1* | 11/2024 | Otterbach ............ G01D 5/2452 |

FOREIGN PATENT DOCUMENTS

| | | |
|---|---|---|
| CN | 112238897 A | 1/2021 |
| CN | 108725576 B | 5/2021 |
| CN | 111547130 B | 6/2022 |
| DE | 10305132 A1 | 11/2004 |
| DE | 102020104423 A1 | 8/2020 |
| EP | 2905206 B1 | 12/2016 |
| WO | 2022185397 A1 | 9/2022 |

* cited by examiner

FIG. 6

SYSTEM AND METHOD FOR PROVIDING A VISUAL AID FOR STEERING ANGLE OFFSET IN A STEER-BY-WIRE SYSTEM

TECHNICAL FIELD

Example embodiments generally relate to vehicle control technology and, more particularly, relate to a system and method for providing a driver facing display that can inform the driver of steering angle offset while driving.

BACKGROUND

Vehicles with steer-by-wire technology do not have a mechanical linkage based connection between the steering wheel and the road engaging wheels. Instead, such vehicles typically employ a feedback actuator that interacts with the steering wheel, and a road wheel actuator that interacts with the road engaging wheel(s) along with electrical communication therebetween. Particularly if different driving modes exist for the vehicle (e.g., normal mode, sport mode, autonomous driving mode, etc.) different steering ratios may be employed such that changing the mode may cause a misalignment between the road wheel angle (set by the road wheel actuator) and the steering wheel angle (set by the feedback actuator). To the extent any misalignment occurs between the road wheel angle and the steering wheel angle, it would be preferable to the driver to be aware of the nature of the misalignment to ensure an intuitive guide is presented to the driver with respect to any manual inputs the driver may otherwise intend to insert. Example embodiments may provide such an intuitive guide that can be implemented to provide a more satisfying user experience for drivers of such vehicles.

BRIEF SUMMARY OF SOME EXAMPLES

In accordance with an example embodiment, a vehicle control system for a vehicle with steer-by-wire steering may be provided. The system may include a road wheel actuator operably coupled to a road wheel of the vehicle to position the road wheel to a road wheel angle based on a target angle, a feedback actuator operably coupled to a steering wheel of the vehicle to generate the target angle based on a steering wheel angle and to generate feedback to an operator of the vehicle, a sensor network comprising sensors to detect the steering wheel angle and the road wheel angle, a display disposed in the vehicle to be visible to the operator of the vehicle during vehicle operation, and a controller for determining when a misalignment exists between the road wheel angle and the steering wheel angle and providing a visual indication of the misalignment on the display.

In another example embodiment, a method of providing visual feedback to an operator of a vehicle with steer-by-wire steering may be provided. The method may include receiving road wheel angle from a sensor network operably coupled to a road wheel actuator, where the road wheel actuator is operably coupled to a road wheel of the vehicle to position the road wheel based on a target angle. The method may further include receiving a steering wheel angle from the sensor network further operably coupled to a feedback actuator, where the feedback actuator is operably coupled to a steering wheel of the vehicle to generate the target angle based on a position of the steering wheel and to generate feedback to the operator of the vehicle. The method may also include determining when a misalignment exists between the road wheel angle and the steering wheel angle, and providing a visual indication of the misalignment on a display disposed in the vehicle to be visible to the operator of the vehicle during vehicle operation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, it may be desirable to provide an intuitive indication to the driver when any potential misalignment exists between the feedback actuator and road wheel actuator. In particular, when the vehicle is operating in an autonomous or self-driving mode, a representation of a visual nature that can be presented to the driver in such a way as to make it clear that if manual control is to be taken, correction of any misalignment would be made by turning the steering wheel in an intuitively apparent way based on the visual representation provided. Example embodiments may provide such an intuitive indication.

Of note, for vehicles with a steer-by-wire system, there is no mechanical linkage between the steering wheel and the road wheels. Instead, a motor or other electrically operable positioning element may be operably coupled to the steering wheel to provide feedback to the driver, and also determine the intent of the driver based on the input provided at the steering wheel for electronic communication to another motor or other electrically operable positioning element that is coupled to the road wheels (e.g., via a steering rack and tie rod). In many cases, these motors or positioning elements are referred to as actuators. Specifically, the actuator that is coupled to the steering wheel may be referred to as a feedback actuator and the actuator that is coupled to the road wheels may be referred to as a road wheel actuator.

Figure 1:
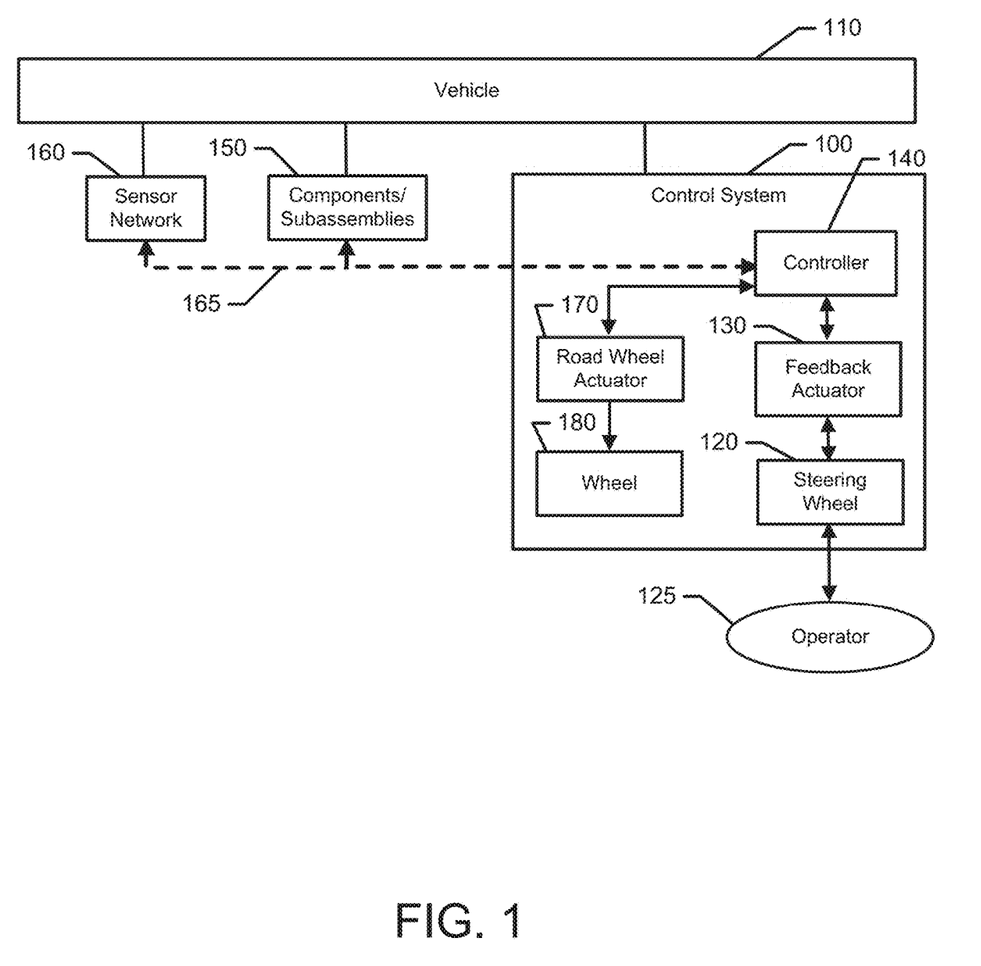
FIG. 1 illustrates a block diagram of a vehicle control system in accordance with an example embodiment.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may have a normal or manual mode of operation that includes an input device in the form of control pedals and the steering wheel 120. The pedals may include a brake pedal and a speed control pedal (e.g., a throttle or gas pedal) pivotally mounted to the floor of the vehicle 110, and operable by an operator 125 (or driver). The brake pedal may generally be used to provide inputs for control of braking torque, and the speed control pedal may be used to provide inputs for control of propulsive torque. However, the normal mode of operation may not be desirable for all cases. Moreover, selectable other modes of operation, including one or more off-road driver assistance modes, parking modes, turn assist modes, autonomous driving modes, etc., may also exist. Accordingly, the control system 100 of some example embodiments may further include a user interface. The operator 125 may operate the user interface, which may include or define a mode selector to shift out of the normal mode of operation and into any of the other modes of operation (or vice versa). Although the mode selector may be the normal way to transfer between modes, some modes may be entered or exited automatically based on specific events or stimuli. For example, the operator 125 may exit the autonomous driving mode by either using the mode selector to select the normal mode, or by providing an input to the steering wheel 120 of at least a threshold magnitude.

The control system 100 of example embodiments may employ a steer-by-wire system, as generally described above. Thus, a hand wheel or steering wheel 120 may be operably coupled to a feedback actuator 130 that determines an angular positioning of the steering wheel 120 for providing an input regarding the intended steering control provided by the operator 125. The feedback actuator 130 may also provide feedback to the operator 125. Thus, for example, the feedback actuator 130 may provide a torque feedback to the operator 125 to simulate the feel of a conventional steering wheel or at least provide sufficient resistive torque to prevent the steering wheel 120 from freely rotating while still being easily controlled by the operator 125. The feedback actuator 130 may include its own internal electronic control unit (ECU) in some cases. The ECU, if included, may provide additional functionality that may include some of the functions and control capabilities described in greater detail below.

Whether or not the feedback actuator 130 includes an instance of the ECU, the feedback actuator may be operably coupled to a controller 140. In some cases, the controller 140 may be part of an electronic control system of the vehicle 110 that is configured to perform other tasks related or not related to steering, propulsive and braking control or performance management. However, the controller 140 could be a dedicated or standalone controller in some cases. In an example embodiment, the controller 140 may receive information that is used to determine vehicle status from various components or subassemblies 150 of the vehicle 110. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 165.

The components or subassemblies 150 may include, for example, the steering wheel 120 of the vehicle, a brake assembly, a propulsion system and/or a road wheel assembly of the vehicle 110. The brake assembly may be configured to provide braking inputs to braking components of the vehicle 110 (e.g., friction brakes, regenerative brakes, electromechanical brakes and/or other mechanical, hydraulic or electrical methods of braking) based on a braking torque determined by the controller 140 and/or a torque control module. The propulsion system may include a gas engine, electric motor, or any other suitable propulsion device.

The controller 140 may be part of a steer-by-wire system that either is or is a portion of the control system 100, and may therefore also be operably coupled to a road wheel actuator 170 that is in turn operably coupled to steerable road wheels (typically the front wheels of the vehicle 110) that form part of the road wheel assembly mentioned above. The steerable road wheels to which the road wheel actuator 170 may be operably coupled are represented by wheel 180 in FIG. 1. More particularly, the road wheel actuator 170 may position the road wheels based on a target angle that is determined by the positioning of the steering wheel 120 and the steering wheel angle associated therewith.

In an example embodiment, one or more corresponding sensors of the sensor network 160 may be operably coupled to the brake assembly and/or the road wheel assembly to provide information relating to brake torque, brake torque rate, vehicle velocity, vehicle rate of change of velocity, individual wheel speeds, front/rear wheel speeds, vehicle pitch, etc. Other examples of the components or subassemblies 150 and/or corresponding sensors of the sensor network 160 may provide information relating to yaw, lateral G force, steering wheel angle, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 (e.g., based on mode selection, steering wheel angle, braking and propulsive torque requests, etc.) relative to control of various aspects of operation of the vehicle 110 and then be configured to use the information received in association with the execution of one or more control algorithms that may be used to provide instructions to a torque control module in order to control application of positive and negative torque to the wheel 180 or wheels of the road wheel assembly of the vehicle 110.

The controller 140 may also provide operable coupling for the steer-by-wire system of the vehicle 110 between the feedback actuator 130 and the road wheel actuator 170. The road wheel actuator 170 may have an ECU located therein in some cases, and various functions (some of which are described herein) may be implemented by the ECU. However, in other examples the controller 140, which may be part of a vehicle control module (VCM) in some cases, may implement the functions described herein relating to providing intuitive visual indications. Moreover, the controller 140 may utilize the input provided by the operator 125 at the steering wheel 120 (which provides a target angle based on the steering wheel angle) to determine what input to provide to the road wheel actuator 170, which may then apply a road wheel angle to the wheel 180 (or wheels). The correspondence between these angles may depend on the mode of operation in some cases.

In an example embodiment, the operator 125 may use the user interface (e.g., a mode selector of the user interface) to select a mode of operation (e.g., normal mode, autonomous mode, turn assist mode, sport mode, etc.). The user interface may be embodied by an interactive display in the vehicle 110, and may therefore be or include one or more instances of a soft switch provided on the display. However, in other examples, the user interface may include a hard switch, a button, key, or other selectable operator located in the cockpit of the vehicle 110. Selection of the mode desired using the mode selector or other user interface elements may correspondingly activate the control system 100 to provide the corresponding functionality described herein based on information provided by the components or subassemblies 150 and/or corresponding sensors of the sensor network 160.

As noted above, when the vehicle 110 is shifted between different modes of operation, corresponding changes may occur with respect to steering ratios employed by the feedback actuator 130 and/or the road wheel actuator 170. For example, in one mode, larger changes is steering wheel angle may be needed to drive a given magnitude of change to road wheel angle and in another mode smaller changes is steering wheel angle may be needed to drive the same given magnitude of change to road wheel angle. Shifting between modes and/or shifting between different steering ratios may therefore be some examples among many possible ways that a misalignment between the road wheel angle and the steering wheel angle may occur. Another way may be the hitting of a pothole or other event that exerts a large force on the wheel 180 that surpasses or exceeds the torque otherwise supplied by the road wheel actuator 170. Still another example may occur when in the autonomous mode, where a misalignment may occur from the steering wheel having no movement, but the vehicle 110 being driven on a tight curve where the operator 125 applies an effort on the steering wheel 120 to momentarily or permanently take over in manual mode (thereby causing a mode shift without using the mode selector).

Regardless of how the misalignment is initiated, any such misalignment should not be immediately corrected. For example, if a pothole causes a misalignment of a given magnitude during autonomous operation, an immediate (autonomously inserted) correction could voluntarily insert another corrective force equaling the given magnitude, which would be as jarring as the initial contact with the pothole. Thus, the misalignment should be diagnosed, and then reduced systematically and in a controlled manner over time. In some cases, the misalignment could be determined, stored, and then reduced as appropriate to control road wheel directional motion and thus vehicle lateral motion. However, this process may be visually confusing to the operator 125 with the steering wheel angle and the heading of the vehicle 110 mismatching. The mismatch may cause the operator 125 to take manual control and either oversteer or understeer in connection with trying to correct the misalignment. Accordingly, while the misalignment exists, a visual display of the misalignment and perhaps also its projected future results if not immediately corrected may be useful to the operator 125 in enabling the operator 125 to take manual control (either through input on the steering wheel 120 or via mode selection) to mitigate the misalignment. Knowing precisely the nature of the misalignment by providing a display visible to the operator 125 to indicate the path of the vehicle 110 based on the misalignment may therefore be of great utility. In an example embodiment, the path of the vehicle 110 may be estimated or projected based on the road wheel angle and/or other information such as vehicle speed, known tire properties, inertial measurements such as yaw rate and lateral rate of change of speed, among potentially others. Operation of the control system 100 will be described in greater detail below in reference to FIG. 2, which illustrates various inputs and outputs that may be involved in providing the solution noted above.

Figure 2:
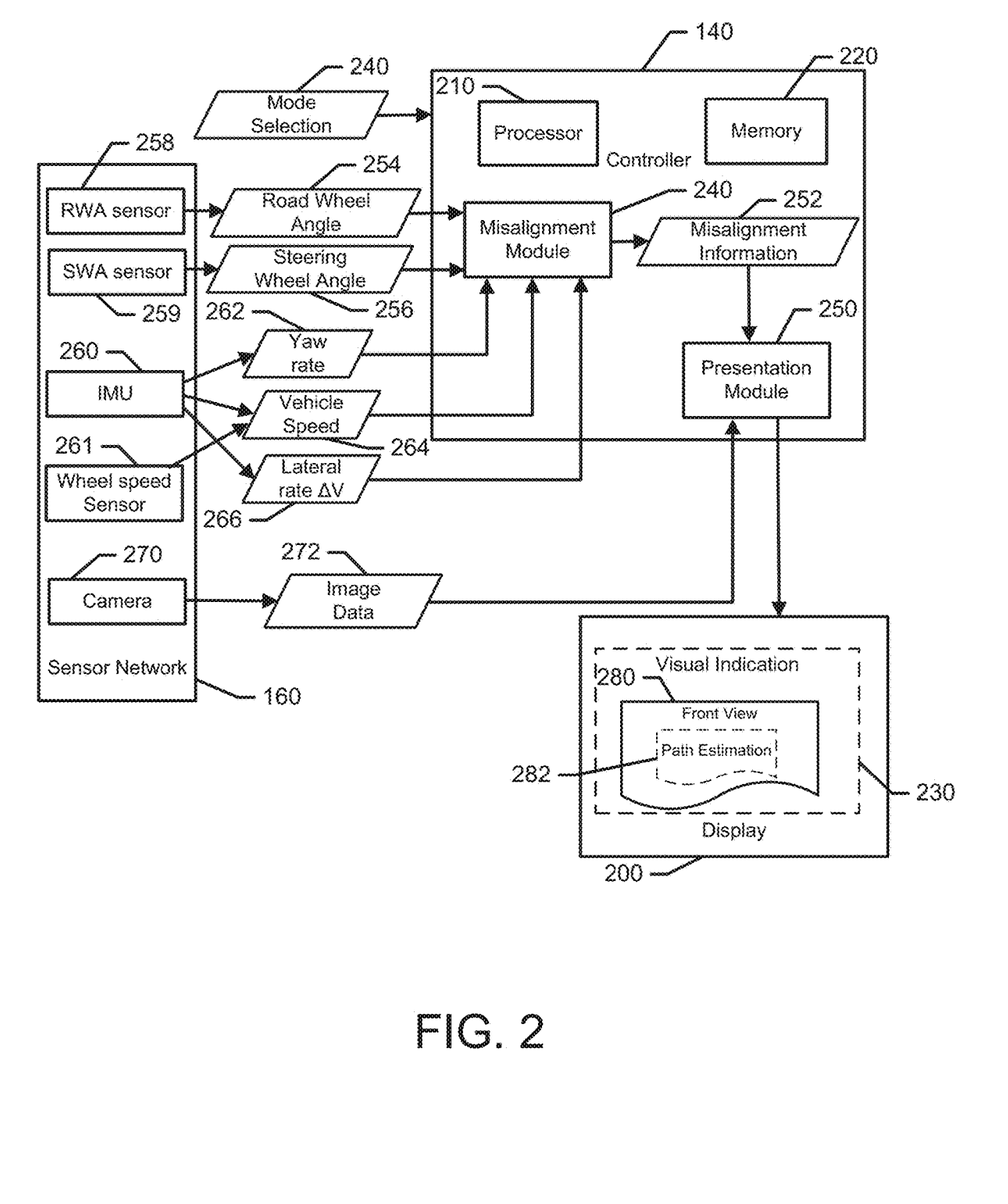
FIG. 2 illustrates a block diagram of some components of the vehicle control system of FIG. 1 in accordance with an example embodiment.

FIG. 2 illustrates a block diagram of various components of the control system 100 in accordance with an example embodiment. In this regard, for example, FIG. 2 illustrates example interactions between the controller 140 a display 200 (of the user interface) and various other components relative to information received by the controller 140 (e.g., from the sensor network 160, from various ones of the components/subassemblies 150, and/or from the user interface). Processing circuitry (e.g., a processor 210 and memory 220) at the controller 140 may process the information received by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received/generated regarding specific conditions of vehicle components. The control algorithms may thereafter execute various functions based on the information received, and generate outputs to drive the display 200 with respect to useful presentation of a visual indication 230. The functions performed by the control algorithms may be performed by respective modules configured for the performance of the respective functions. The configuration of the modules may be accomplished via instructions stored at the memory 220 and executed by the processor 210 in some cases.

In an example embodiment, the modules may include a misalignment module 240 and a presentation module 250. However, it should be appreciated that the misalignment module 240 and the presentation module 250 could be combined into a single module in some cases, or various functions thereof may be further distributed into other modules in other cases. Thus, the presentation shown in FIG. 2 is an example, and is not limiting in relation to how the functions performed may be executed.

The misalignment module 240 may receive inputs from a plurality of sources or sensors (e.g., of the sensor network 160) and determine a misalignment information 252 on the basis of the information received. In some cases, the misalignment information 252 may simply be a calculated difference between a road wheel angle 254 and a steering wheel angle 256 received at the misalignment module 240. The road wheel angle 254 may be reported to the misalignment module 240 by a road wheel angle sensor 258, which may be disposed proximate to the road wheel actuator 170 (or otherwise operably coupled thereto) to determine the road wheel angle 254. Similarly, the steering wheel angle 256 may be reported to the misalignment module 240 by a steering wheel angle sensor 259, which may be disposed proximate to the feedback actuator 130 (or otherwise operably coupled thereto) to determine the steering wheel angle 256. However, in some cases, misalignment may be calculated based on a comparison of stored steering ratio values for the road wheel actuator 170 and the feedback actuator 130 associated with each of the respective different driving modes.

In some embodiments, rather than simply determining a magnitude of any misalignment, the misalignment module 240 may further be configured to determine a future effect of the misalignment with respect to vehicle motion going forward. To accomplish this future projection, an inertial measurement unit (IMU) 260, gyroscope, GPS, or other sensor may be employed to determine various additional pieces of information associated with inertial measurements that may be used to estimate future motion. Some non-limiting examples of parameters that may be measured (e.g., by the IMU 260) may include a yaw rate 262, vehicle speed 264 and a rate of change in the vehicle speed, which may include a lateral component that may be useful (i.e., a rate of change in lateral velocity (lateral rate $\Delta V$) 266). However, the vehicle speed 264 may alternatively be provided by a wheel speed sensor 261, or may be determined based on engine speed. When further augmented with inertial measurements, the misalignment information 252 may include not only a magnitude of the misalignment that currently exists (e.g., between the road wheel angle 254 and the steering wheel angle 256), but a projection of how that misalignment will affect vehicle motion going forward.

The misalignment information 252 may be provided to the presentation module 250, which may be configured to generate the visual indication 230 for visual presentation at the display 200 based on the misalignment information 252. In some cases, the visual indication 230 may only be displayed at all when there is a misalignment detected. The display 200 may otherwise display nothing, other information, or may be fully transparent when there is no misalignment detected. However, in some cases, the visual indication 230 may only be provided when in autonomous driving mode as a visual aid to the operator 125 with respect to potentially taking the vehicle 110 out of the autonomous driving mode.

Figure 3:
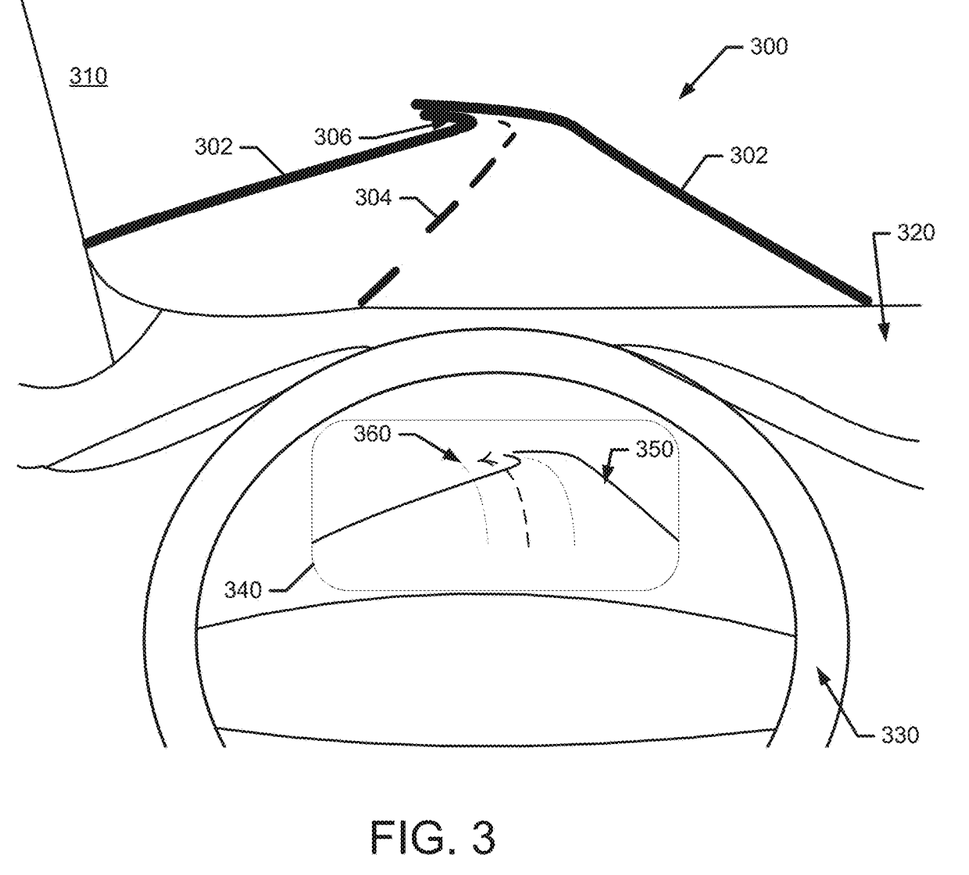
FIG. 3 illustrates a view from the perspective of an operator of the vehicle with a display showing a visual indication of a misalignment between road wheel angle and steering wheel angle in accordance with an example embodiment.

In some embodiments, a camera 270 may capture image data 272 corresponding to the road or scene ahead of the vehicle 110. The image data 272 may be used to generate a front view 280 for visual presentation at the display 200. The front view 280 may therefore be a representation of video data indicative of the road or scene generally visible to the operator 125 in real time (e.g., similar to the view through the windshield of the vehicle 110). Meanwhile, a projected path of the vehicle 110 based on the misalignment information 252 may be visually presented as a path estimation 282. In some cases, the presentation module 250 may present the path estimation 282 as an overlay over the front view 280. FIG. 3 provides an example of such a presentation paradigm.

Referring to FIG. 3, a view from the perspective of the operator 125 of the vehicle 110 of FIG. 1 is shown. In this regard, an actual view 300 of the scene or path/road ahead of the vehicle 110 is visible through the windshield 310 and over the dash 320 and steering wheel 330 is shown. The actual view 300 shows road edges 302 and a lane divider 304, but such features may not be present in all cases. The existence of the road edges 302 and lane divider 304 of this example, however, show that a curve 306 to the left is approaching in the distance.

If it happens to be the case that a mode shift, pothole, or other event caused a misalignment to occur prior to the moment in time depicted in FIG. 3, the misalignment may cause the vehicle 110 to be directed (over time and without correction) on a path that does not match with the actual path of the road ahead. As noted above, an immediate correction is undesirable. Thus, while gradual correction is implemented (until the misalignment is eliminated or reduced below a threshold amount), an example of the display 200 of FIG. 2 may be used to represent the visual indication 230 described above. In this example, display 340 is provided in an instrument cluster disposed in the dash 320 (and visible through the steering wheel 330). The display 340 shows a front view 350 that is a visual representation (e.g., video) of the scene or path/road ahead of the vehicle 110. Moreover, a path estimation 360 is shown as an overlay on top of the front view 350. In this case, the path estimation 360 happens to show that the misalignment is causing an oversteer condition for the vehicle 110 heading into the curve 306. Thus, if the operator 125 should choose to insert a manual input on the steering wheel 330 to compensate for the misalignment, the operator can clearly see that an adjustment of the steering wheel 330 to the right (for this example) is appropriate, and further have an intuitive idea of the magnitude needed for the compensation. The path estimation 360 also shows a representation of the roadway ahead with an arrow extending from the center showing the general direction and magnitude of misalignment. However, a different form of representation could be chosen in other cases. For example, a simple arrow left or right with the size of the arrow or thickness of the arrow increasing proportional to the amount of misalignment may alternatively be employed. Numerical misalignment values may also be shown (e.g., with a left or right indication) in alternative cases.

Figure 4:
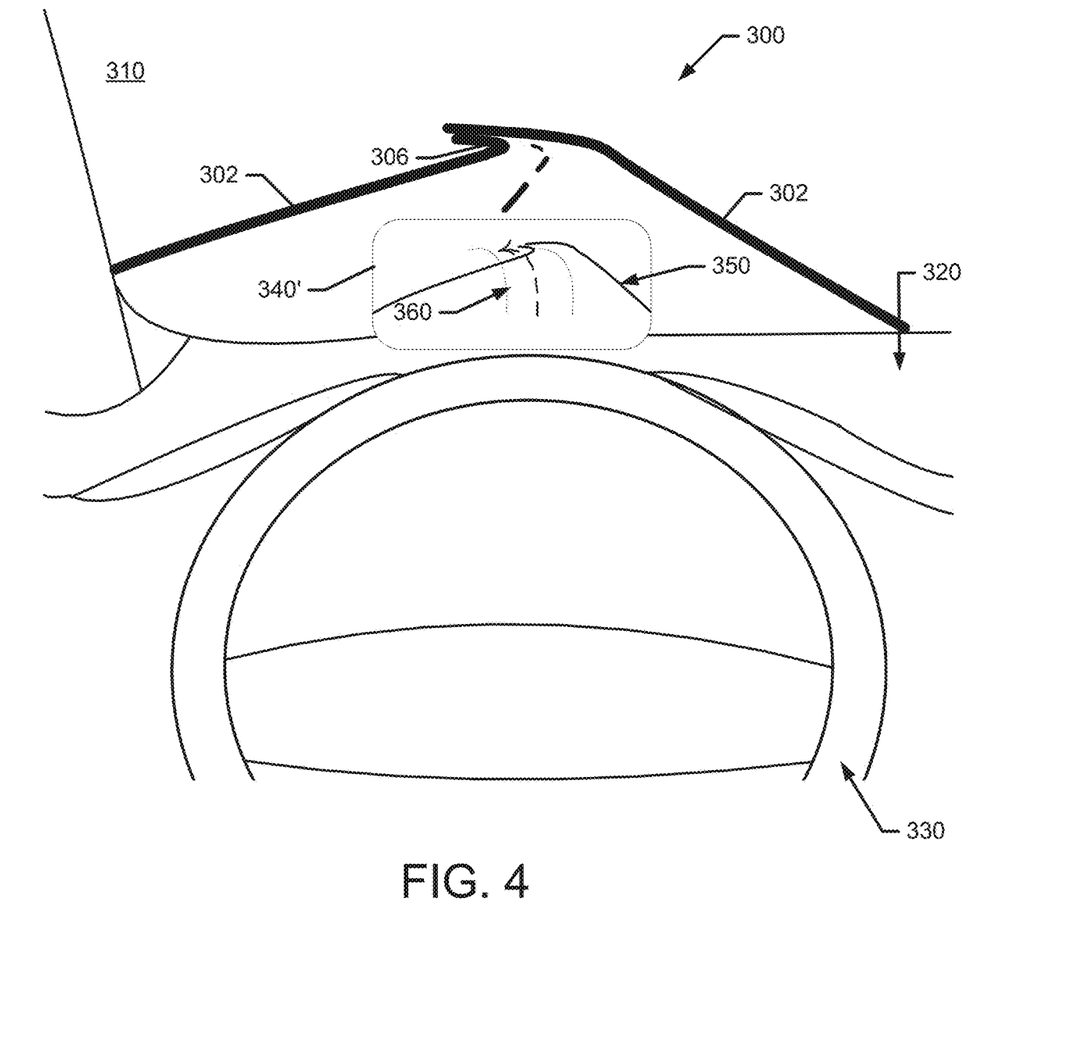
FIG. 4 illustrates a display similar to that of FIG. 3 moved to a different location in accordance with an example embodiment.
Figure 5:
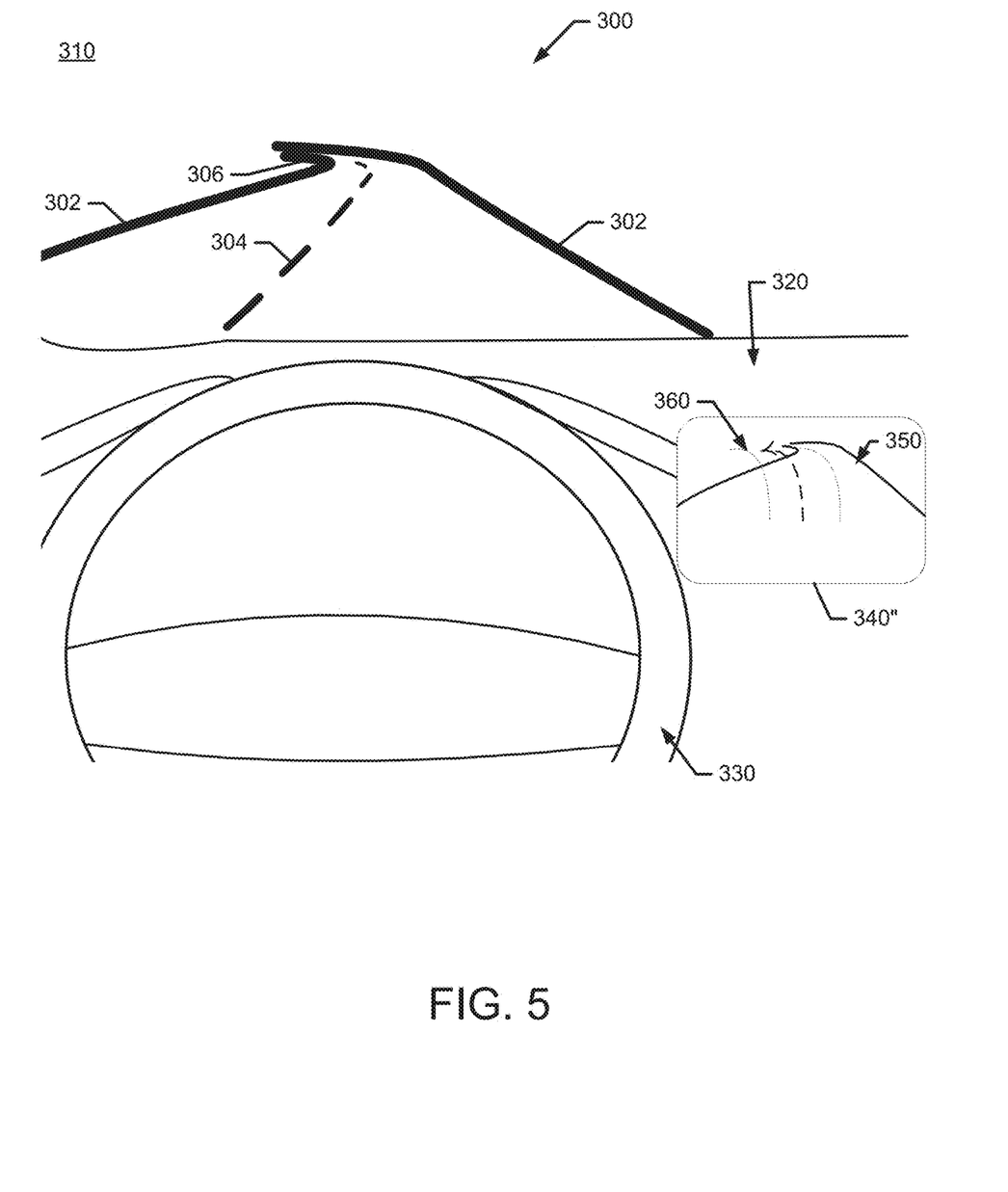
FIG. 5 illustrates a display similar to that of FIG. 3 moved to still another different location in accordance with in accordance with an example embodiment.

As noted above, the display 200 may be implemented in any suitable location that is visible to the operator 125. Thus, whereas FIG. 3 illustrates the display 340 disposed in or as part of an instrument cluster in the dash 320, FIG. 4 shows display 340' either on top of the dash 320 or integrated into the windshield 310. If integrated into the windshield 310, the display 340' may be transparent when there is no misalignment. If a misalignment occurs, then the display 340' may show the visual indication 230 via the front view 350 and path estimation 360, as shown on the windshield 310. Still other locations for the display 200 are also possible. In this regard, FIG. 5 shows still another example in which the display 340' is located to the right of the steering wheel 330 in the dash 320.

Apart from showing a display with a path estimation, the display could alternatively show an equivalent steering angle instead, e.g., via a steering wheel image. Alternatively or additionally, in the steer-by-wire context, a screen may be added to the center of the steering wheel, and an avatar (e.g., of the steering wheel or a logo or other feature) could be shown rotated to the equivalent steering angle position to demonstrate misalignment. Again alternatively or additionally, one or more lights may be provided on the steering wheel or other display, and the color of the light may create a 12 o'clock mark to indicate direction of the equivalent steering position.

Figure 6:
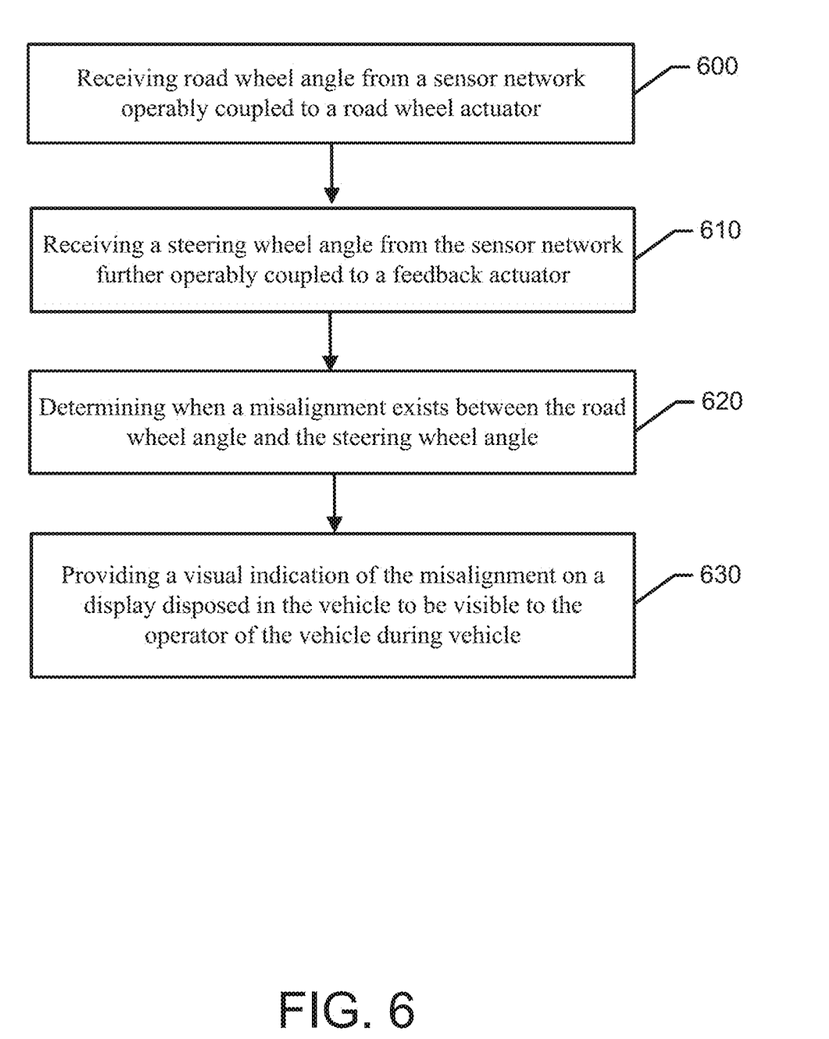
FIG. 6 illustrates a method of providing visual feedback to an operator of a vehicle with steer-by-wire steering in accordance with an example embodiment.

FIG. 6 illustrates a block diagram of one example method of providing visual feedback to an operator of a vehicle with steer-by-wire steering. The method may include receiving road wheel angle from a sensor network operably coupled to a road wheel actuator at operation 600, where the road wheel actuator is operably coupled to a road wheel of the vehicle to position the road wheel to the road wheel angle based on a target angle determined based on steering input. The method may further include receiving a steering wheel angle from the sensor network further operably coupled to a feedback actuator at operation 610, where the feedback actuator is operably coupled to a steering wheel of the vehicle to generate the target angle based on the steering wheel angle, which in turn is determined based on a position of the steering wheel and to generate feedback to the operator of the vehicle. The method may also include determining when a misalignment exists between the road wheel angle and the steering wheel angle at operation 620, and providing a visual indication of the misalignment on a display disposed in the vehicle to be visible to the operator of the vehicle during vehicle operation at operation 630.

Example embodiments may therefore also include a vehicle control system for a vehicle with steer-by-wire steering. The system may include a road wheel actuator operably coupled to a road wheel of the vehicle to position the road wheel to a road wheel angle based on a target angle, a feedback actuator operably coupled to a steering wheel of the vehicle to generate the target angle based on a steering wheel angle determined based on a position of the steering wheel and to generate feedback to an operator of the vehicle, a sensor network comprising sensors to detect the steering wheel angle and the road wheel angle, a display disposed in the vehicle to be visible to the operator of the vehicle during vehicle operation, and a controller for determining when a misalignment exists between the road wheel angle and the steering wheel angle and providing a visual indication of the misalignment on the display. The system may provide the operator with visual cues that intuitively guide the operator with respect to correcting misalignment situations. However, example embodiments could also be employed in other cases. For example, if there is a motor inoperability condition (e.g., in the feedback actuator) that prevented the provision of feedback torque, the visual cues provided by example embodiments may assist the operator with respect to determining road wheel direction.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the controller may display a front view ahead of the vehicle and further provides a path estimation as an overlay on the front view. In an example embodiment, the front view may include an image of a path or roadway ahead of the vehicle, and the path estimation may demonstrate a departure from the path or roadway responsive to determining that the misalignment exists. In some cases, the display of the visual indication of the misalignment may only be provided when the vehicle is operating in an auto driving mode. In an example embodiment, the visual indication of the misalignment may enable the operator of the vehicle to take manual control of the steering wheel to eliminate the misalignment by correcting the departure. In some cases, the display may be disposed at an instrument cluster proximate the steering wheel, or at a heads up display overlapping a portion of a windshield of the vehicle. In an example embodiment, the misalignment may be based on different steering ratios in respective different driving modes, and the controller may calculate the misalignment based on a comparison of stored steering ratio values associated with each of the respective different driving modes. In some cases, the controller may be located at a vehicle control module disposed between the feedback actuator and the road wheel actuator. In an example embodiment, the controller may be disposed at an electronic control unit of the feedback actuator or the road wheel actuator. In some cases, providing the visual indication of the misalignment on the display may include only providing the visual indication when the misalignment exists. In an example embodiment, the display may be transparent when the controller does not provide the visual indication.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system for a vehicle with steer-by-wire steering, the system comprising:
   a road wheel actuator operably coupled to a road wheel of the vehicle to position the road wheel to a road wheel angle based on a target angle;
   a feedback actuator operably coupled to a steering wheel of the vehicle to generate the target angle based on a steering wheel angle and to generate feedback to an operator of the vehicle;
   a sensor network comprising sensors to detect the steering wheel angle and the road wheel angle;
   a display disposed in the vehicle to be visible to the operator of the vehicle during vehicle operation; and
   a controller for determining when a misalignment exists between the road wheel angle and the steering wheel angle and providing a visual indication of the misalignment on the display, wherein the visual indication of the misalignment is a path estimation showing an oversteer condition as an overlay on a front view provided responsive to detecting the misalignment.

2. The system of claim 1, wherein the front view comprises an image of a path or roadway ahead of the vehicle, and
wherein the path estimation demonstrates a departure from the path or roadway responsive to determining that the misalignment exists.

3. The system of claim 2, wherein the display of the visual indication of the misalignment is only provided when the vehicle is operating in an auto driving mode.

4. The system of claim 3, wherein the visual indication of the misalignment enables the operator of the vehicle to take manual control of the steering wheel to eliminate the misalignment by correcting the departure.

5. The system of claim 1, wherein the display is disposed at an instrument cluster proximate the steering wheel.

6. The system of claim 1, wherein the display is a heads up display overlapping a portion of a windshield of the vehicle.

7. The system of claim 1, wherein the misalignment is based on different steering ratios in respective different driving modes, and
wherein the controller calculates the misalignment based on a comparison of stored steering ratio values associated with each of the respective different driving modes.

8. The system of claim 1, wherein the controller is located at a vehicle control module disposed between the feedback actuator and the road wheel actuator.

9. The system of claim 1, wherein the controller is disposed at an electronic control unit of the feedback actuator or the road wheel actuator.

10. The system of claim 1, wherein providing the visual indication of the misalignment on the display comprises only providing the visual indication when the misalignment exists.

11. The system of claim 10, wherein the display is transparent when the controller does not provide the visual indication.

12. A method of providing visual feedback to an operator of a vehicle with steer-by-wire steering, the method comprising:
receiving road wheel angle from a sensor network operably coupled to a road wheel actuator, the road wheel actuator being operably coupled to a road wheel of the vehicle to position the road wheel based on a target angle;
receiving a steering wheel angle from the sensor network further operably coupled to a feedback actuator, the feedback actuator being operably coupled to a steering wheel of the vehicle to generate the target angle based on a position of the steering wheel and to generate feedback to the operator of the vehicle;
determining when a misalignment exists between the road wheel angle and the steering wheel angle; and
providing a visual indication of the misalignment on a display disposed in the vehicle to be visible to the operator of the vehicle during vehicle operation,
wherein the visual indication of the misalignment is a path estimation showing how the misalignment will affect vehicle motion going forward as an overlay on a front view provided responsive to detecting the misalignment, and
wherein the display of the visual indication of the misalignment is only provided when the vehicle is operating in an auto driving mode.

13. The method of claim 12, wherein the front view comprises an image of a path or roadway ahead of the vehicle, and
wherein the path estimation demonstrates a departure from the path or roadway responsive to determining that the misalignment exists.

14. The method of claim 13, wherein providing the visual indication comprises only occurs when the misalignment exists.

15. The method of claim 12, wherein providing the visual indication comprises providing the visual indication at an instrument cluster proximate the steering wheel.

16. The method of claim 12, wherein providing the visual indication comprises providing the visual indication at a heads up display overlapping a portion of a windshield of the vehicle.

17. The method of claim 12, wherein the misalignment is based on different steering ratios in respective different driving modes, and
wherein the misalignment is determined based on a comparison of stored steering ratio values associated with each of the respective different driving modes.

18. The method of claim 12, wherein the method is performed by a controller located at a vehicle control module disposed between the feedback actuator and the road wheel actuator or at an electronic control unit of the feedback actuator or the road wheel actuator.

19. A vehicle control system for a vehicle with steer-by-wire steering, the system comprising:
a road wheel actuator operably coupled to a road wheel of the vehicle to position the road wheel to a road wheel angle based on a target angle;
a feedback actuator operably coupled to a steering wheel of the vehicle to generate the target angle based on a steering wheel angle and to generate feedback to an operator of the vehicle;
a sensor network comprising sensors to detect the steering wheel angle and the road wheel angle;
a display disposed in the vehicle to be visible to the operator of the vehicle during vehicle operation; and
a controller for determining when a misalignment exists between the road wheel angle and the steering wheel angle and providing a visual indication of the misalignment on the display,
wherein the visual indication of the misalignment is a path estimation showing how the misalignment will affect vehicle motion going forward as an overlay on a front view provided responsive to detecting the misalignment, and
wherein providing the visual indication of the misalignment on the display comprises only providing the visual indication when the misalignment exists.

* * * * *